United States Patent

Kawakubo et al.

[15] 3,689,145
[45] Sept. 5, 1972

[54] SLIT EXPOSURE TYPE COPYING

[72] Inventors: Kazuo Kawakubo, Kawasaki; Akira Kurahashi, Tokyo, both of Japan

[73] Assignee: Canon Kabishiki Kaisha, Tokyo, Japan

[22] Filed: April 6, 1970

[21] Appl. No.: 25,653

[30] Foreign Application Priority Data

April 8, 1969 Japan .......................44/27453

[52] U.S. Cl. ...........................355/8, 355/65, 355/66
[51] Int. Cl. ..............................................G03g 15/04
[58] Field of Search..............................355/65, 66, 8

[56] References Cited

UNITED STATES PATENTS

| | | | |
|---|---|---|---|
| 3,543,290 | 11/1970 | Koizumi | 355/8 X |
| 3,497,298 | 2/1970 | Watanabe | 355/66 X |
| 3,041,167 | 6/1962 | Blakney et al. | 355/17 X |
| 3,062,109 | 11/1962 | Mayo et al. | 355/8 |
| 3,535,038 | 10/1970 | Stievenart et al. | 355/66 |
| 3,062,108 | 11/1962 | Mayo | 355/8 |

Primary Examiner—Samuel S. Matthews
Assistant Examiner—E. M. Bero
Attorney—Joseph M. Fitzpatrick, John Thomas Cella, Charles B. Cannon, Lawrence F. Scinto, Carroll G. Harper, Charles W. Bradley, Edwin T. Grimes, William J. Brunet and Robert L. Baechtold

[57] ABSTRACT

A copying device comprising an original table mounted in a housing to accept an original to be copied; an illuminating means for illuminating an original mounted on said original table; a first mirror mounted to move horizontally relative to said original table; a projection lens mounted in the direction of the reflection of the light image coming from the direction of the normal line to the original by said first mirror, and mounted to move horizontally relative to said original table at the same speed as the first mirror; a second mirror mounted perpendicularly to said original table to reflect the light image that is passed by said first mirror and said projection lens; means to drive said first mirror, projection lens, and said second mirror synchronously in order to scan and expose sequentially the original on said original table; a photosensitive member which moves at a predetermined speed relative to first mirror, said projection lens, and said second mirror, and means to drive the photosensitive member.

25 Claims, 8 Drawing Figures

PATENTED SEP 5 1972 3,689,145

SLIT EXPOSURE TYPE COPYING

This invention relates to a copying device and more particularly to a slit exposure type copying device which can readily be miniaturized.

Up to the present, copying devices embodying silver salt photography, microphotography, electrophotography, electrolytic photography, thermosensitive photography, etc. have hitherto been generally known. All of them require a means to irradiate the original image that has to be copied. For example, in the case of a hitherto well-known electrophotographic copying device, the copying device comprises a photosensitive member comprising a conductive base and a photoconductive layer laid thereon, means capable of charging said photosensitive member uniformly, means for irradiating the original image to be copied, means to develop with an electrophotographic developing agent, means to transfer the developed visible image to the copying material, and means to fix the transferred image to the copying material, etc.

In the present-day society, an ever increasing volume of information has to be studied and communicated, and copies of written information are an absolute necessity to fulfill this need. Accordingly, demand for high-speed office copying equipment is increasing day by day, and manufacturers of copying devices are endeavoring constantly to produce such a device.

Generally speaking the, tendency of miniaturization of office copying devices is prevailing from the viewpoints of space, simplicity, etc. For this purpose, in such copying devices compactizing the optical system and the means used to irradiate the optical image is considered to be the most effective means of accomplishing the miniturization of an office copying device.

A copying device having an optical system for irradiating the optical image on the moving photosensitive member by moving the original holder in order to compactize the entire unit has hitherto been suggested. However, the above-mentioned original holder moving type copying device has a complicated mechanism of synchronizing the original holder with the photosensitive member, is hard to operate, and is accompanied with danger.

Moreover, in copying heavy originals such as a thick and large-sized book, a large load works near the original holder and gives an unfavorable effect on the mechanism.

Consequently, this invention solves the defects of the above-mentioned moving type copying device and offers a device in which the original holder is fixed, a first mirror and projection lens are made to move in unison parallel to the original, and a second mirror installed perpendicular to the original holder is moved in synchronism with said movement.

In this case, it is important to interlock the photosensitive member, the scanning mirror, and the projection lens synchronously.

In this invention this is accomplished by causing the second mirror to move in such a way that it is moved in association with the first mirror and the projection lens moved in unison under the supporting table so as to keep the length of the light path to the surface of the movable photosensitive member constant, and by using a belt to drive the scanning device without employing a complex gear train.

Therefore, the slit exposure type copying device of this invention, employing a fixed supporting table for the original to be copied is very simple in handling the original because even a thick and voluminous original can be handled by only laying it on the supporting table and, at the same time, the moving mechanism also becomes simple. These features are highly desirable in office use copying equipment.

Accordingly, the main object of this invention is to provide an office-use copying device.

The second object of this invention is to provide a compact and inexpensive fixed-original-supporting-table type copying device.

The third object of this invention is to provide a copying device employing slit exposure by scanning the mirror and the projection lens.

Another object of this invention is to offer a copying equipment in which the mirror and the projection lens are moved by means of belt, and which is simply constructed and easily manufactured.

A further object of this invention is to provide a copying equipment having a compactized size in which the projection lens is installed between both moving mirrors to shorten the total light path length.

A still further object of this invention is to provide a copying device which is very easy to assemble and adjust and highly economical.

The above and other objects of this invention will be more apparent from the following description referring to the illustrative embodiments shown in the drawings, in which:

Figure 1:
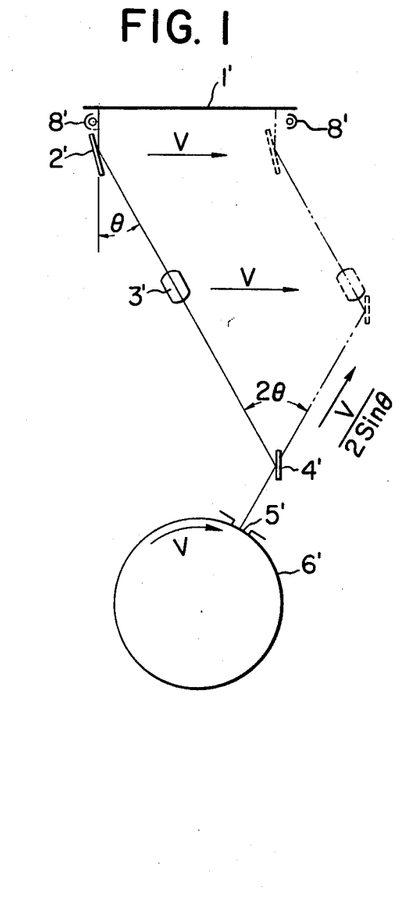
FIGS. 1 and 2 show the outline of an embodiment of the optical system applicable to the invented slit exposure type copying device.

FIG. 1 shows one scanning optical system to be applied to the copying device of this invention, in which 1' is an original, 8' is a light source for illuminating the original, 2' is a first mirror that moves parallel to the original 1', 4' is a second mirror that moves as shown in the drawing, 5' is a fixed slit, and 6' is a photosensitive surface which rotates. The light source 8' can be fixed to illuminate the entire width of the original 1' or can be moveably mounted to scan the original in synchronism with the movement of the first mirror 2' as described hereinafter. An example of equal size copying will be explained referring to FIG. 1. However, enlarged or reduced copying can of course be attained by varying properly the moving speed of the photosensitive surface.

In FIG. 1, the first mirror 2' is obliquely arranged to turn the light emerged from the surface of the original in the direction of the normal line to the surface to the direction at an angle $\theta$ to the normal line. The phototaking lens 3' is arranged on the line running in said deflected direction. The second mirror 4' is arranged perpendicular to the surface of the original so as to reflect the light from the lens 3' in oblique direction toward the slit 5' and forms the image of the original on the photosensitive surface 6' in slit form.

In this case, when photographing, the first mirror 2' and the lens 3' are moved in unison in the direction of arrow, parallel to surface 1' of the original at a speed of V, the second mirror 4' is moved in the direction of the reflected light by the mirror 4' at a speed of $V/2 \sin \theta$, and the photosensitive surface 6' is moved in the direction of arrow at a speed of V.

In this device, the direction in which the second mirror 4' moves is at an angle of $2\theta$ to the optical axis of the lens 3', and, when moving, the relationship shown by broken lines is established to maintain the distance between the surface of the original 1' and the photosensitive surface 6' always constant. Moreover, by setting the first mirror 2' in such a way as $\theta = 30°$, The moving speeds of both mirrors and the lens become identical.

According to the optical system of the embodiment of FIG. 1, two mirrors are sufficient to meet the purpose and, since there are only two moving systems, the device becomes simpler when said system is applied, and, since the phototaking lens is situated between both moving mirrors, the total length of light path can be shortened and the entire device can be compactized.

Figure 2:
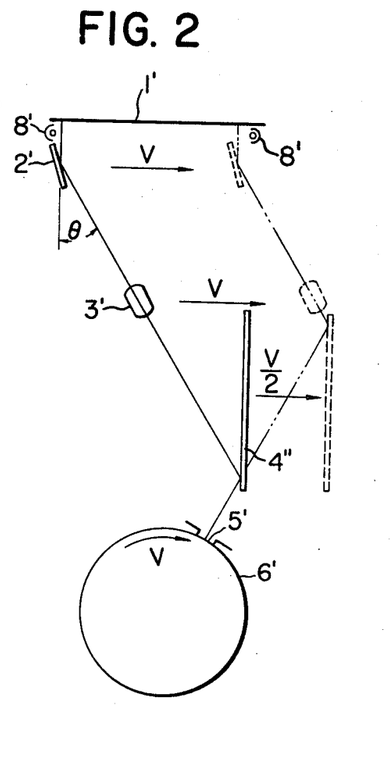

FIG. 2 shows another embodiment of optical system to be applicable to the invented copying device. The difference of this embodiment from the one shown in FIG. 1 is that when said optical system is applied to a copying device, the moving speeds of the two moving system can be synchronized in such a manner that the second mirror is driven to move at a velocity half of that the first mirror and in the same direction of that of the first mirror, regardless of the relection angle $\theta$ by the first mirror 2'. This enables the moving mechanism to be made simpler and, at the same time, improves it accuracy.

In the optical system of FIG. 2, the first mirror and the projection lens are moved linearly parallel to the original holder similar to the case of FIG. 1. In this embodiment, however, the second mirror 4'' is made to move parallel to the original holder like the first mirror and lens. In operation, the first mirror 2' and the projection lens 3' and the photosensitive surface are scanned at the same speed V, and the second mirror 4'' is moved at the speed of V/2, regardless of the angle $\theta$ formed by the normal line and the reflected line by the first mirror 2'. When this system is applied to a copying device, the moving mechanism can be made simpler than the one shown in FIG. 1 and the accuracy can be improved further.

Figure 3:
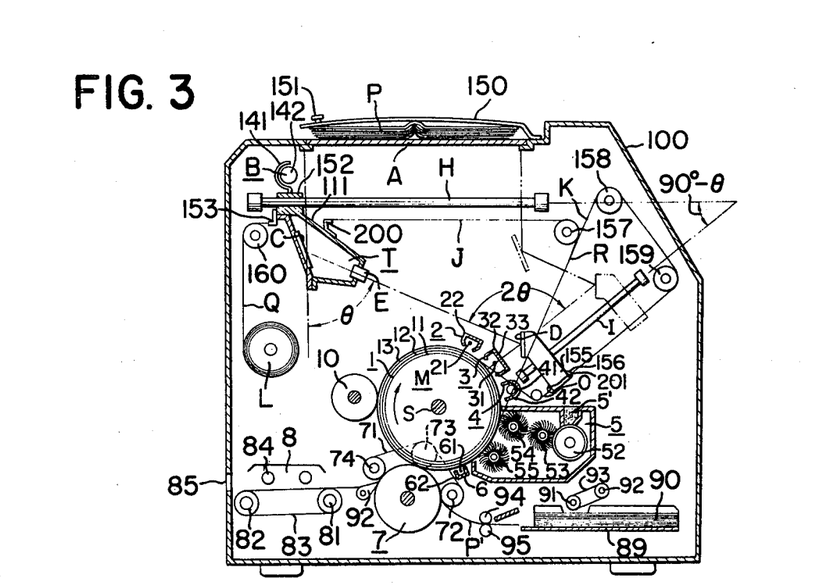
FIG. 3 shows a simple structural drawing of an embodiment of a preferrable type of electronic photographic copying equipment provided with the optical system described in FIG. 1.

Next, FIG. 3 will be explained. FIG. 3 shows an electrophotographic copying equipment in which the optical system described in FIG. 1 is assembled. It shows a particularly favorable type of equipment. The example shown in FIG. 3 is an embodiment of the electrophotographic process disclosed in the copending applications, Ser. No. 563,899 filed July 8, 1966 and Ser. No. 571,538 filed Aug. 10, 1966, abandoned and carried forward in continuation application Ser. No. 116,557 filed Feb. 18, 1971, in which a photosensitive member comprising a base plate, a photoconductive layer and an insulating layer laid thereon undergoes primary charging, is subjected to image irradiation with contemporaneous charging opposite in polarity to the primary charging or AC corona discharge, and then, when required, is subjected to whole surface irradiation of a radiation to which the photoconductive layer is sensitive, in order to form a highly contrasty electrostatic latent image.

In FIG. 3, 100 shows a housing which accommodates each means required for an electrophotographic equipment, and 1 shows the photosensitive drum comprising a conductive base 11, having a photoconductive layer 12 laid thereon, and a translucent insulating layer 13 laid further thereon. The photosensitive drum 1 is mounted for rotation on the rotary shaft S. According to the process, it is possible to make the conductive base transparent so that image irradiation from inside the drum is possible. The primary charger 2 comprises the corona electrode 21 and the shielding plate 22 surrounding it. The electrode 21 is connected to a power supply not indicated in the drawing by way of a lead wire so that a voltage having arbitrary polarity can be applied to the electrode 21. The corona discharger 3 for changing and contemporaneous exposing is composed of the corona discharge electrode 31 and the shielding plate 32 surrounding it and having the upper section optically opened for slit exposure. The discharge electrode 31 is connected to a power supply not indicated in the drawing so that charging opposite in polarity to the charging polarity applied by the aforementioned charger 2 or AC corona discharge can be made.

An image of the original is projected on the photosensitive surface by the scanning of the optical system which will be described later in detail when corona discharge is made by the corona discharger 3 for simultaneous charging and exposure through the optical opening provided at the upper section of the discharger 3 and through the optical system which will be described in detail hereinafter. The whole surface exposure unit 4 comprises the light source 41 and light shielding plate 42. However, it is not a necessary condition to provide a whole surface exposure unit and the unit can be omitted. The developing unit 5 which develops the electrostatic image formed on the photosensitive member 1 is advanced by the previously mentioned process with the electrophotographic developer 51 through the roller 52 and the developing brushes 53, 54, and 55. The charger 6 comprises the corona discharge electrode 61 connected to a power supply not indicated in the drawing and the shielding plate 62 surrounding the electrode. This is to perform the later process of image transfer effectively, but can be omitted.

Figure 4:
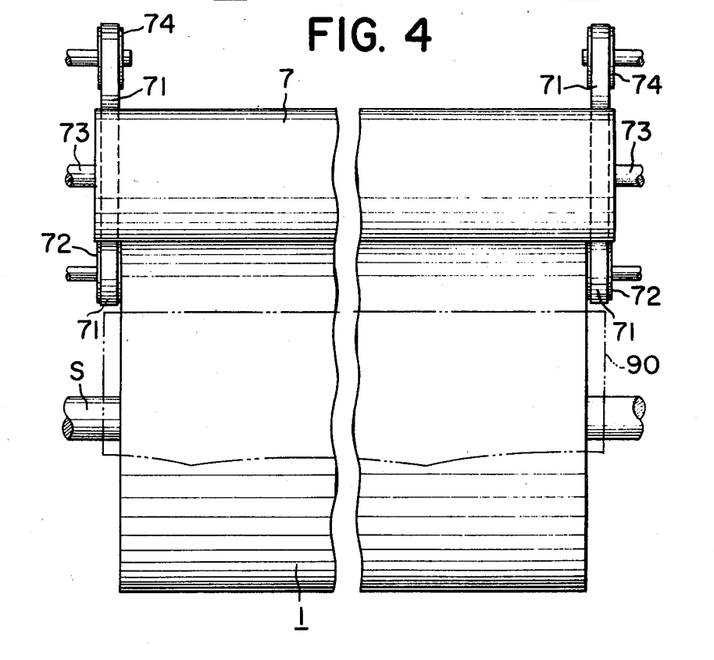
FIG. 4 shows the construction of the image transfer section of the electrophotographic copying equipment shown in FIG. 3.

Reference numeral 7 is the transfer roller, 89 is the paper feed table, 90 is the paper pile placed on it, 92 is the roller connected to the drive source not indicated in the drawing, 93 is the transfer material feed belt, 91 is the paper feed roller, and 94 and 95 are the transcription paper feed rollers. Similarly, 72, 73, and 74 show the drive rollers and 71 shows transferable paper feed belt. The paper piled on the paper feed table is sent sheet after sheet by the action of the feed roller 91, passed between the feed rollers 94 and 95, pressed by the transfer roller 7 to transfer the visible image. FIG. 4 shows the transfer section in detail. The portion of the transferable paper, after image transfer that has passed the transfer roller 7 is sandwiched at one edge between the transfer roller 7 and the separation belt 71 which is provided on one side or both sides of the transfer drum 7 which is made a little longer than the photosensitive drum and along its half surface as shown FIG. 4, and is separated from the photosensitive drum, and then carried along the transfer roller 7. It is then guided to the fixing section by the separation pawl 92 which is in light contact with the transfer roller 7. Reference numeral 8 shows the fixing unit comprising the heat source 84, rollers 81 and 82 and the belt 83, and 85 shows the outlet through which the fixed copy is carried to the outside of the machine. A cleaning roller 10 is used to remove the developing agent remaining on the photosensitive member after transfer. Thus one cycle of processing has been completed and the same thing is performed repeatedly.

Next, the means to perform slit exposure of the image of the original through the optical opening at the upper section of the contemporaneous charging and exposing discharger 3 will be described in detail.

A is the transparent holder of the original P and 150 is the original cover that presses the original P. The original P is put in or taken out by catching the handle 151 provided on one end (left end in FIG. 3) of the cover 150 and by moving it vertically. B is the light source used to illuminate the fixed original which is composed of the light source 142 and its shielding plate 141. Although the light source section B can be fixed as shown in FIG. 1, in FIG. 3 there is shown an example in which the light source is movable with the mounting table 111 of the scanning section comprising the first mirror and the projection lens which will be described in detail in the following. The scanning section T comprises the first mirror indicated by C which moves parallel to the original P and the projection lens indicated by E which is provided in the direction of reflected light by the first mirror and is moved parallel to the original P. Both are combined into one unit fixed to the mounting table 111. H show the guide provided on both sides and parallel to the original holder A whose function is to move smoothly the first mirror C and the projection lens E combined into one unit.

Figure 5:
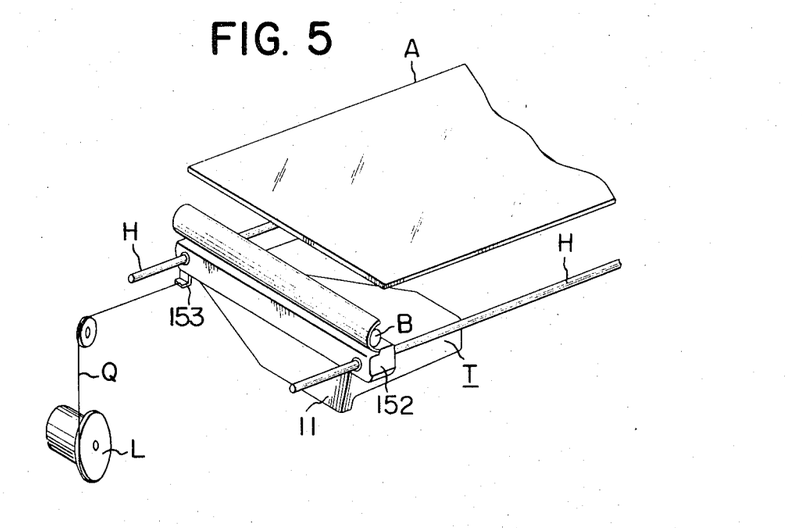
FIG. 5 shows a perspective view of the scanning section of the electrophotographic copying equipment of FIG. 3.

FIG. 5 shows the mode of moving the scanning section T. On the guide H, there is provided a sliding piece 152 to slide thereon and on the sliding piece 152 is fixed the mounting table 111 fitted with the first mirror C and the projection lens E. The first mirror C and the projection lens E are thus moved smoothly in one unit.

Reference numeral 153 is a protruding piece provided on the sliding piece 152 as shown in FIGS. 3 and 5 where the reversing tension belt is provided. To the tension belt is connected a spring-driven or driven return device L. And 200 is a protruding piece provided on the mounting table 111 as shown in the drawing to which a drive belt shown by J for advancing the scanning section is connected. D is the second mirror that moves in connection with the scanning section, comprising the first mirror and the projection lens that move in one unit, in such a way that the length of the optical path to the photosensitive member 1 is always constant.

The first mirror C is so provided as to fix the original holder A and to turn the light originating at the surface of the original and travelling in the direction of the normal line to the surface to the direction at angle $\theta$ to the normal line, and the second mirror D, which is provided perpendicular to the surface of the original so as to receive the light that has passed the projection lens situated in the path of reflected light and to reflect it in the oblique direction, is moved in the direction at an angle of $90° - \theta$ to the horizontal plane and at an speed of $V/2 \sin \theta$ for purpose of synchronization. In short, the second mirror D is moved in the direction X — X which is the direction of the light reflected by itself.

The speed at which the first mirror C and the projection lens E are moved in one unit is assumed to be V. I is the guide provided in such a way as to move the second mirror D, making an inclination of $90° - \theta$ against the horizontal plane. It is provided with a sliding piece fitted slidably to it. To the sliding piece is fixed the edge of the mounting table 155 of the second mirror D so that the second mirror D is enabled to move in the $90° - \theta$ direction smoothly. Although not indicated in the drawing, the guide I is provided on each edge when moving the mounting table 155, as was explained when scanning the scanning section T. Reference numeral 156 is a protruding piece provided on the lower end of the mounting table of the secondary mirror D. On the protruding piece 156 is set a tension belt K which functions to move the mirror D obliquely upward, and 201 is a protruding piece provided similarly on the lower end of the opposite side of the mounting table of the second mirror D. A pull-back belt O used to move the mirror D obliquely downward is set on the protruding piece 201.

Figure 6:
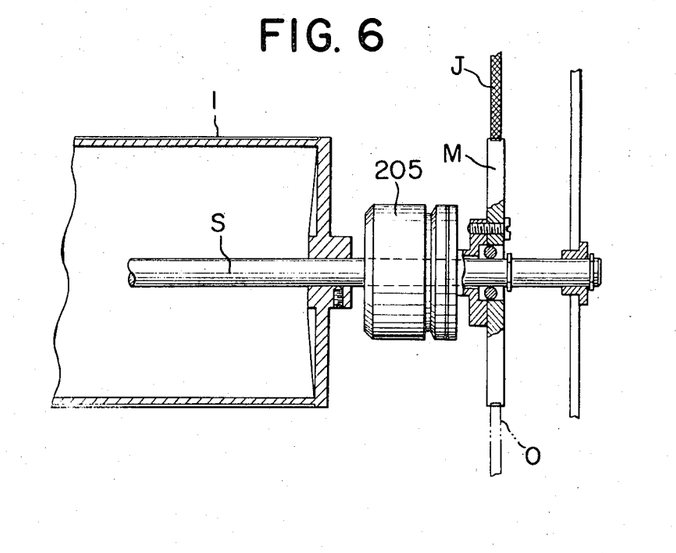
FIG. 6 shows a clutch section of the electrophotographic copying device of FIG. 3.

Next, the means to synchronize the rotation of the drum 1 of the photosensitive member with the movement of the first mirror C and the second mirror D will be described in detail. FIG. 6 illustrates such means. A synchronizing drum M is provided coaxially with the photosensitive drum 1, and the tension belts J and K of the first mirror C and second mirror D are hung on the drum, and one end of each is fixed to the rotary drum M. In FIG. 3, the belts J and K are put together at point R, hung on and fixed to the rotary drum. The pull-back belt O of the second mirror D is wound around the synchronizing drum M in opposite direction to the belts J and K as shown in the drawing, and its end is fixed. The pull-back belt Q of the first mirror C and projection lens E is connected to the separate spring-driven or motor-driven return device L.

In this case, however, the pull-back belt Q is allowed to be hung around the synchronizing drum M together with the belt O and the similar effect can be obtained if, in this case, return drive source is built within the drum M.

An electromagnetic clutch 205 (FIG. 6) is provided between the synchronizing drum M and the shaft S or the photosensitive drum 1. When the first mirror C and the projection lens E move from the left end position shown by solid lines (FIG. 3) and reach the right end position (the second mirror D moves from lower left to upper right), they are sensed by the sensing means not indicated in the drawing, and the electromagnetic clutch 205 is released. Therefore, at that point, the synchronizing drum M is in free state and by the drive force of the return device L working in the reverse direction, the synchronizing drum M is rotated in the reverse direction to the direction shown by the arrow to restore the first mirror C and second mirror D. And 157 is the guide roller of the belt J, 158 and 159 are the guide rollers of belt K, and 160 is the guide roller of the belt Q.

Operation of the electrophotographic copying device shown in FIG. 3 will be explained hereinafter. The surface 13 of the insulating layer of the photosensitive member 1 is charged in advance uniformly either positive or negative by the charger 2. Electric charge reverse in polarity to the said charge is bound at the interface between the photoconductive layer 12 and the transparent insulating layer 13 or within the photoconductive layer. Next, the surface of said charged insulating layer 13 is subjected to the original image irradiation and contemporaneously to charging reverse in polarity to the previous charge or to A.C. corona discharge, to form an electrostatic image of the original image, which is caused by the difference in surface potential produced according to the dark-light pattern of the original image, on the surface of said insulating layer 13. In this case, the original image irradiation, which is performed contemporaneously with the charging reverse in polarity to the previous charging or AC corona discharge, is performed as described hereinafter.

Since the rotary drum M rotates in the direction of arrow with the rotation of the photosensitive drum 1 the belts J and K fixed to the drum M are taken up by the rotary drum M and, by the action of the belts J and K, the scanning section T provided with the first mirror C and the projection lens E combined into one unit is pulled to right and the second mirror D is pulled obliquely toward upper right, and made to scan until the position shown with chain lines is reached. Thus the original image is irradiated. At the instant the projection lens has finished scanning, it is sensed by a sensing means not indicated in the drawing, and the electromagnetic clutch 205 provided between the photosensitive drum 1 and the rotary drum M is released. Accordingly, the rotary drum M is in free state and, by the action of the return device L connected to the pull-back belt Q of the first mirror C. The first mirror C and the second mirror D are returned from positions indicated by the chain lines to the positions indicated by solid lines. Further, by using the whole surface exposure unit 4, whole surface of the aforementioned insulating layer is exposed uniformly, and a high contrast electrostatic image is formed on the surface of the aforementioned insulating layer 13. Further, the aforementioned electrostatic image is developed and visualized by the developing means 54 and 55 using the developing agent consisting mainly of charged colored particles in the developing case 5, and then charged to arbitrary polarity by the charger 6. Then, by feeding the transferable material P', such as paper from the pile 90 placed on the paper feed table 89, one sheet at a time, by the action of the feed roller 91, and the aforementioned visible image is transferred on the paper by the transfer roller 7.

Next, the transferable material P that has a transferred image on it is conveyed by the action of the belt 71 etc., and the transferred image is fixed on the material P by the application of heat rays from the fixing unit 8. Thus a copy is obtained. The copy that has undergone fixation is discharged to the outside of the machine through the exit 84 of the housing 100. On the other hand, after transcription, the surface of the aforementioned insulating layer is cleaned by the cleaning roller 10 to remove the remaining charged particles and to use the aforementioned photosensitive member repeatedly. So far the case where $\theta \approx 30°$ in FIG. 3, the speed of the scanning section T equals the moving speed of the second mirror D. Therefore, the synchronizing drum M is made to have the same diameter as the photosensitive drum 1 and the scanning section T and the second mirror D can be driven by the same drum 1. If $\theta \neq 30°$, the ratio between the speed of the scanning section T and the moving speed of the second mirror D becomes $V : V/2 \sin \theta$ and it is necessary to provide separately a synchronizing drum having diameters of this proportion.

Figure 7:
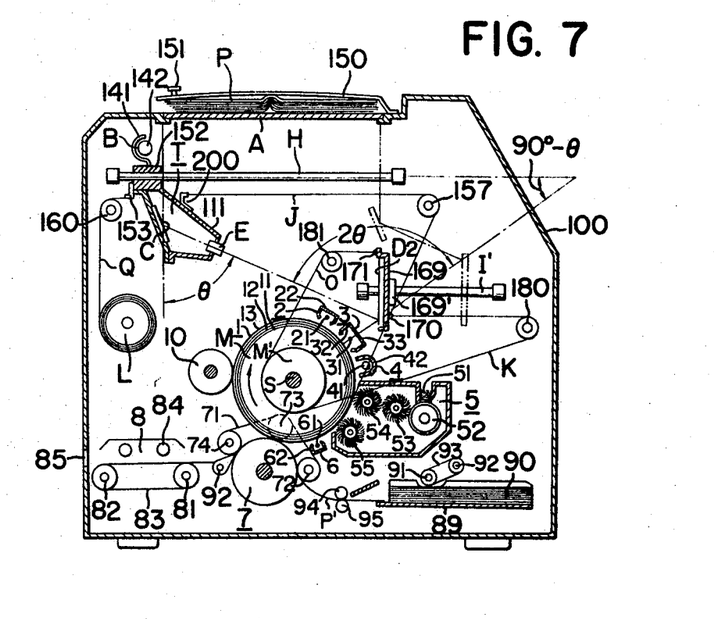
FIG. 7 shows a simple structural drawing of another embodiment of a favorable type of electrophotographic copying device provided with the optical system described in FIG. 2.
Figure 8:
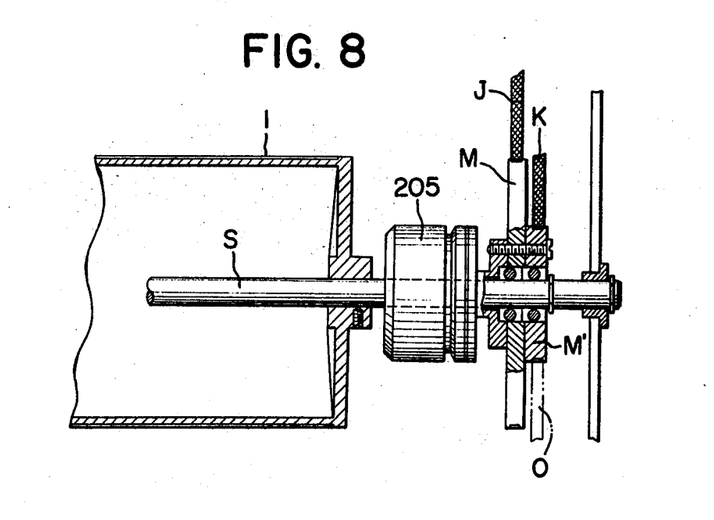
FIG. 8 shows a clutch section of the electrophotographic copying device of FIG. 7.

FIG. 7 shows a preferable type of electrophotographic copying device in which the optical system described in FIG. 2 is assembled. Compared with the device described in FIG. 3, the moving mechanism is further simplified. The electrophotographic copying device described in FIG. 7 is provided with almost the same means as the one described in FIG. 3 except for some of the means, for example, the means to move the second mirror $D_2$. Therefore, the same numbers have been used to show the same means both in FIG. 3 and in FIG. 7. Therefore, means that are not found in FIG. 3 will be explained. I' indicates the guide provided to move the second mirror $D_2$ parallel to the surface of the original P. On it is slidably mounted a sliding piece 169'. On the sliding piece 169' the edge of the mounting table 169 of the second mirror $D_2$ is fixed to enable the second mirror to move smoothly parallel to the surface of the original P. Moreover, the guide I' is to be provided at both edges of the mounting table, although it is not indicated in the drawing, and 170 is a protruding piece provided on the lower end of the mounting table 169 of the second mirror $D_2$ and, on the protruding piece 170 is set a tension belt shown by K and used to move the mirror $D_2$ rightward. The protruding piece 171 is mounted at the upper part of the mounting table 169 of the second mirror $D_2$ and on the protruding piece 171 is set the pull-back belt D and used to move the mirror $D_2$ leftward. Each belt is hung on the synchronizing drum indicated by M' and one end of the belt is fixed on the drum. The synchronizing drum M' is to be installed as shown in FIG. 8.

Also in the electrophotographic copying device described in FIG. 7, in order to project the image of the original P through the slit, the scanning section T comprising the first mirror C and the projection lens E combined in one unit and fixed on the mounting table 111 is made to move straight forward facing to the original P placed on the fixed original holder A and along the guide H which is parallel to the original holder A, and, the second mirror $D_2$ facing the first mirror in V shape is made to move straight forward along the guide I' which is parallel to the horizontal guide H to project the image of the original scanned by the scanning section T to the photosensitive layer through the slit of the exposure unit 3.

In this embodiment, the rotation of the photosensitive drum 1 is synchronized with the movement of the scanning section T and the second mirror $D_2$. Synchronizing drums M and M' (FIG. 8) are provided coaxially with the photosensitive drum 1. The tension belts J and K of the scanning section T and the second mirror $D_2$ are hung on drums M and M', and one end of each belt is fixed on the synchronizing drums M and M'. The pull-back belts O and Q of the synchronizing section T and the second mirror $D_2$ are interlocked with the pull-back drive source. As for the means, it is allowed to set the pull-back belt O of the second mirror $D_2$ on the synchronizing drum M' in opposite direction of the belt K and fix an end on the drum and to connect the pull-back belt Q of the scanning section T to a separate spring-driven or motor-driven return device L, or to set and fix both pull-back belts Q and O on the drum M. In the latter case the return drive source is provided in the drum.

Next, like the embodiment of FIG. 3, the electromagnetic clutch 205 is installed between the synchronizing drums M and M' and the shaft S or the photosensitive drum 1. The clutch is released by the sensing signal for the arrival of the scanning section T at the right end, the synchronizing drums M and M' are freed, the synchronizing drum M is rotated in the direction reverse to the arrow by the driving force of the return device L, and, at the instant of the end of one cycle of copying process, both the scanning section T and the second mirror D are restored to the original positions.

In this embodiment, the ratio of the moving distances or speeds of the scanning section T and the second mirror $D_2$ is 2 : 1 regardless of the angle $\theta$ with which the photosensitive layer is exposed to the original surface. Therefore, the ratio of the diameters of the synchronizing drums M and M' are made 2: 1 and, the diameter of the synchronizing drum M which is the drive source of the scanning section T is made to equal to the diameter of the photosensitive drum, the optical system comprising the scanning section T and the second mirror D is always synchronized with the photosensitive drum. In FIG. 7, 180 indicates the guide roller of the tension belt K of the second mirror $D_2$, and 181 indicates the guide roller of the pull-back belt O of the second mirror $D_2$.

In the foregoing, only the electrophotographic copying device applied to the process disclosed in said copending applications have been described referring to FIG. 3 and FIG. 7. However, the invention is of course not limited to said process. For example, an electrophotographic device utilizing the so called Xerox system where charging, exposure, development, transcription, and fixing processes are applied to the photosensitive member comprising a conductive base plate and a photoconductive layer laid thereon, is also possible. Moreover, the invented device to which are applied silver salt photography, electrolytic photography, and thermosensing photography can be considered.

As has been described, the copying device of the present invention employs a system wherein the original is fixed, therefore even a thick and voluminous original can be handled easily because it is sufficient only to place the original on the original holder, and, since the projection lens is installed between both moving mirrors, the total length of the light path can be reduced and, as a result, the entire device can be effectively compactized.

The moving mechanism can be made simple and its accuracy can be improved particularly when $\theta$ is 30° in the case of applying the optical system of FIG. 1 and independent of the angle $\theta$ in the case of applying the optical system of FIG. 2. Moreover, since a simple interlocking relationship is sufficient in this invention, provision of complicated cam and gear train is unnecessary, and simple interlocking means, such as a belt can meet the purpose. Therefore, this invention has a practical effect in that manufacture, assembly, and adjustment of the equipment are simple, that is is economically excellent, and that it contributes to compactize the copying device.

What is claimed is:

1. A copying device performing slit exposure by a scanning mirror and projection lens which comprises,
   an original table mounted in a housing to support an original to be copied;
   a fixed illuminating means for illuminating the entire width of an original mounted on said original table;
   a first mirror mounted to move horizontally relative to said original table;
   a projection lens mounted in the path of the light image reflected from the direction of the normal line to the original by said first mirror, and mounted to move horizontally relative to said original table at the same speed as the first mirror;
   a second mirror mounted perpendicular to said original table to reflect the light image that is passed by said first mirror and said projection lens;
   means to drive said first mirror, projection lens, and said second mirror synchronously in order to scan and expose sequentially the original on said original table;
   a photosensitive member which moves at a predetermined speed relative to said first mirror, said projection lens, and said second mirror, and means to drive said photosensitive member.

2. A copying device performing slit exposure as set forth in claim 1, in which said second mirror moves at an angle of 90°−$\theta$ and at a speed of ½ sin $\theta$ of that of said first mirror when the angle between the extension of the incoming light from the direction of the normal line of said original table to said first mirror and the reflected light is $\theta$.

3. A copying device performing slit exposure as set forth in claim 1, in which said second mirror is mounted to scan parallel to the surface of the original at half the speed as that of said first mirror.

4. A copying device performing slit exposure as set forth in claim 1, in which said first mirror and said projection lens are made to scan in one unit parallel to the surface of the original.

5. A copying device performing slit exposure by a scanning mirror and a projection lens which comprises,
   a fixed original table mounted in a housing to support an original thereon;
   a moving illuminating means mounted under said original table to illuminate said original;

a first mirror mounted to move horizontally relative to said original table at the same speed as that of said illuminating means;

a projection lens mounted in the path of the light image reflected from the direction of the normal line to said original by said first mirror and mounted to move horizontally relative to said original table at the same speed as that of said first mirror;

a second mirror mounted perpendicular to the original table to reflect the light image that is passed by said first mirror and said projection lens;

means to drive synchronously said first mirror, said projection lens, and said second mirror in order to scan and expose sequentially the original on said original table; and a photosensitive member which moves at a predetermined relative speed with respect to said illuminating means, said first mirror, said projection lens, and said second mirror, and means to drive said photosensitive member.

6. A copying device performing slit exposure as set forth in claim 5, in which said second mirror moves at an angle of $90° - \theta$ and at a speed of $\frac{1}{2} \sin \theta$ of the speed of said first mirror when the angle between the extension of the light incoming to said first mirror from the direction of the normal line to said original table and the reflected light is $\theta$.

7. A copying device performing slit exposure as set forth in claim 5, in which said second mirror is mounted to scan parallel to the surface of the original at half the speed as that of said first mirror.

8. A copying device performing slit exposure as set forth in claim 5, in which said illuminating means and said first mirror are made to scan in one unit parallel to the surface of the original.

9. A copying device performing slit exposure by a scanning mirror and projection lens, which comprises, a fixed original table mounted in a housing in order to support an original thereon;

a fixed illuminating means mounted under said original table for illuminating an original on said original table;

a first mirror mounted to move horizontally relative to said original table;

a projection lens mounted in the path of the light image incoming from the direction of the normal line to said original and reflected by said first mirror and said projection lens being mounted to move horizontally relative to said original table at the same speed as that of said first mirror;

a moving second mirror mounted perpendicular to said original table to reflect the light image that is passed by said first mirror and said projection lens;

means to drive synchronously said first mirror, said projection lens, and said second mirror in order to scan and expose the original on said original table sequentially;

a photosensitive member having an insulating layer overlying a photoconductive layer, which moves at a predetermined relative speed with respect to said first mirror, said projection lens, and said second mirror in order to be exposed sequentially to the light reflected by said second mirror;

charging means for charging said photosensitive member, discharging means for simultaneously charging and exposing said photosensitive member through an optical opening to light reflected by said second mirror, developing means for forming a visible image on said photosensitive member, transferring means and cleaning means provided at sequentially disposed stations along said photosensitive member;

means to feed copy material to said transferring means and means to fix said visible image transferred onto the copy material by said transferring means.

10. A copying device performing slit exposure as set forth in claim 9, in which illuminating means for surface exposure are interposed between said discharging means of said photosensitive member and said developing means along said photosensitive member.

11. A copying device performing slit exposure, which comprises, a fixed original table mounted in a housing to support an original thereon;

illuminating means positioned under said original table and mounted to move relative thereto for illuminating an original on said original table;

a first mirror mounted to move horizontally relative to said original table at the same speed as that of said illuminating means;

a projection lens mounted in the path of the light image reflected from the direction of the normal line to said original by said first mirror, and mounted to move horizontally relative to said original table at the same speed as that of said first mirror;

a moving second mirror mounted perpendicular to said original table to reflect the light image that is passed by said first mirror and by said projection lens;

means to drive synchronously said illuminating means said first mirror, said projection lens and said second mirror in order to scan and expose the original on said original table sequentially;

a photosensitive member which moves at a predetermined relative speed with respect to said illuminating means, said first mirror, said projection lens, and said second mirror in order to be exposed sequentially to the light reflected by said second mirror;

charging means for charging said photosensitive member, discharging means for simultaneously charging and exposing said photosensitive member to the light reflected by said second mirror, developing means for forming a visible image on said photosensitive member, transferring means, and cleaning means provided at sequentially disposed stations along said photosensitive member;

means to feed copy materials to said transferring means, and means to fix the visible image that has been transferred on said copy material by said transferring means.

12. A copying device as set forth in claim 11, in which illuminating means for surface exposure of said photosensitive member are interposed between said discharging means and said developing means along said photosensitive member.

13. A copying device performing slit exposure by a scanning mirror and projection lens which comprises, an original table mounted in a housing to support thereon an original to be copied;

fixed illuminating means for illuminating the entire width of an original positioned on said original table;

a first mirror mounted to move horizontally relative to said original table;

a projection lens mounted in the path of the light image incoming from the direction of the normal line to said original and reflected by said first mirror, and said projection lens mounted to move horizontally relative to said original table at the same speed as that of said first mirror;

a moving second mirror mounted perpendicular to said original table to reflect the light image that is passed by said first mirror and said projection lens;

means to drive synchronously said first mirror, said projection lens, and said second mirror in order to scan and expose sequentially an original on said original table;

a photosensitive member which moves at a predetermined relative speed with respect to said first mirror, said projection lens, and said second mirror in order to be exposed sequentially to the light reflected by said second mirror;

charging means for charging said photosensitive member an image exposing slit for exposing said photosensitive member to the light reflected by said second mirror, developing means for forming a visible image on said photosensitive member transferring means, and cleaning means provided at sequentially disposed stations along said photosensitive member; and means to feed copy material to said transferring means.

14. A copying device performing slit exposure by a scanning mirror and a projection lens which comprises, a fixed original table mounted on said copying device to support an original to be copied;

a light source for illuminating said original on said original table, said light source being placed under said original table and being moveable parallel to said original table;

a first mirror mounted to move horizontally relative to said original table at the same speed as that of said light source;

a projection lens mounted in the path of the light image coming in from the direction of the normal line to said original and reflected by said first mirror, and mounted to move horizontally relative to said original table at the same speed as that of said first mirror;

a moving second mirror mounted perpendicular to said original table to reflect the light image that is passed by said first mirror and said projection lens;

means to drive synchronously said light source, said first mirror, said projection lens, and said second mirror to scan and expose sequentially an original on said original table;

a photosensitive member having a photoconductive layer on a conductive base, which moves at a predetermined relative speed with respect to said light source, said first mirror, said projection lens, and said second mirror to be exposed sequentially to the light reflected by said second mirror;

charging means for charging said, photosensitive member an image exposing slit for exposing said photosensitive member to light reflected by said second mirror, developing means for developing a visible image on said photosensitive member, transferring means, and cleaning means provided at sequentially disposed stations along said photosensitive member; and means to feed copy material to said transferring means.

15. A copying device performing slit exposure by a scanning mirror and projection lens which comprises, an original table adapted to support an original to be copied;

fixed illuminating means under said original table for illuminating the entire width of said original;

a scanning section comprising a first mirror and a projection lens which is mounted to move in one unit horizontally relative to said original table, said projection lens being mounted in the direction of the light reflected from the direction of the normal line to said original by said first mirror;

a second mirror mounted perpendicular to said original table, which reflects the light image that is passed by said first mirror and said projection lens and is mounted to move in synchronization with said scanning section;

scanning section belt means for driving said scanning section from one end of said original table to the other to scan an original thereon;

second mirror belt means for moving said second mirror in synchronization with said scanning section;

tension drive means connected to said scanning section belt means for moving said second mirror in synchronization with the scanning motion of said scanning section;

driving means to return said scanning section and said second mirror to original starting positions after the scanning of the original;

slit means mounted to pass sequentially the image reflected by said second mirror; and a photosensitive member adjacent said slit means which moves at a predetermined relative speed with respect to said scanning section and said second mirror.

16. A copying device performing slit exposure by a scanning mirror and projection lens which comprises, an original table adapted to support an original to be copied;

illuminating means for illuminating an original, said illuminating means being mounted under said original table to move parallel to said original table;

a scanning section containing a first mirror and a projection lens which is mounted to move, in one unit, horizontally relative to said original table, said projection lens being mounted in the path of the light reflected from the direction of the normal line to said original by said first mirror;

a second mirror mounted perpendicular to reflect the light image that is passed by said first mirror and said projection lens, and said second mirror mounted to move in synchronization with said scanning section;

scanning section belt means for driving said scanning section and said illuminating means from one end of said original table to the other;

second mirror belt means for moving said second mirror in synchronization with said scanning section;

tension drive means connected to second scanning section belt means for moving said second mirror in synchronization with the scanning of said scanning section;

driving means for returning said illuminating means, said scanning section, and said second mirror to original starting positions after scanning;

slit means for scanning the reflected image from said second mirror sequentially; and a photosensitive member which is mounted near said slit means to move at a predetermined relative speed with respect to said illuminating means, said scanning section, and said second mirror.

17. A copying device performing slit exposure by a scanning mirror and projection lens which comprises, an original table adapted to support an original to be copied;

fixed illuminating means for illuminating the whole width of said original on said original table;

a scanning section comprising a first mirror and a projection lens, which is relative to said original table, said projection lens being mounted in the path of the light reflected from the direction of the normal line to said original by said first mirror;

a second mirror which is mounted perpendicular to said original table, to reflect the light image that is passed by said first mirror and said projection lens, and moves in synchronization with said scanning section;

scanning section belt means for driving said scanning section to scan said original table from one end to the other;

second mirror belt means for driving said second mirror in sychronization with said scanning section;

a photosensitive drum which moves at a predetermined relative speed with respect to said scanning section and said second mirror, and means to drive said photosensitive drum;

two synchronizing drums of different diameters coupled to said photosensitive drum by a clutch;

tension belt means fixed on one of said synchronizing drums to move said scanning section with the movement of said photosensitive drum;

tension belt means of said second mirror fixed to the other synchronizing drum for moving said second mirror;

means for releasing said clutch at the end of the scanning of said scanning section and said second mirror;

pull-back means provided on said first mirror to restore said scanning section to the original position after scanning and means to drive said pull-back means; and belt means wound around said other synchronizing drum in reverse direction to said tension belt to pull back said mirror after scanning.

18. A copying device as set forth in claim 17, in which said pull-back means is hung on said other synchronizing drum in reverse direction to said tension belt of said first mirror and in addition, a return means is provided on said other synchronizing drum.

19. A copying device as set forth in claim 17, in which said photosensitive drum comprises a conductive base and a photoconductive layer and a transparent insulating layer laid successively on said conductive base, and charging means for charging said photosensitive drum, discharging means for charging and exposing said photosensitive drum through an optical opening to light reflected by said developing means for forming a visible image on said photosensitive drum, transferring means, and cleaning means provided at sequential disposed stations along said photosensitive drum, and paper feeding means for feeding paper to said transferring means and fixing means provided near said transferring means.

20. A copying device as set forth in claim 18, in which, surface illuminating means are interposed between said charging means and said developing means.

21. A copying device performing slit exposure by a scanning mirror and projection lens, which comprises, an original table adapted to support an original to be copied;

fixed illuminating means for illuminating the entire width of an original placed on said original table;

scanning section comprising a first mirror and a projection lens which are mounted to move in one unit horizontally with respect to said original table, said first mirror being so, mounted that the angle between the extension of the light travelling in the direction of the normal line of the original and the reflected light is 30°, and said projection lens being mounted in the path of the light reflected from the direction of the normal line to said original by said first mirror;

a second mirror mounted perpendicular to said original table, to reflect the light image that is reflected by said first mirror and projection lens said second mirror being mounted to move in synchronization with said scanning section, making an angle of 60° with the horizontal plane;

scanning section belt means to drive said scanning section to scan said original table from one end to the other;

second mirror belt means for moving said second mirror in synchronization with said scanning section;

a photosensitive drum which moves at a predetermined relative speed with respect to said scanning section and said second mirror, and means to drive said photosensitive drum;

a synchronizing drum provided coaxially with said photosensitive drum by a clutch;

tension belt means for said scanning section and said second mirror said tension belt means being wound and fixed on said synchronizing drum to move said scanning section and second mirror with the movement of said photosensitive drum;

means to release said clutch by sensing the end of scanning of said scanning section and said second mirror;

belt means to wind said tension belt on said photosensitive drum in reverse direction in order to pull back said second mirror after scanning;

pull-back means installed on said first mirror to pull back said scanning section after scanning and means to drive said pull-back means.

22. A copying device as set forth in claim 21, in which said pull-back means is placed on said synchronizing drum in reverse direction to said tension belt means and in addition a return device is provided for said synchronizing drum.

23. A copying device as set forth in claim 21, in which said photosensitive drum comprises a conductive base, a photosensitive layer and a transparent insulating layer sequentially overlying said base, and primary charging means for charging said photosensitive drum, charging means for, simultaneously charging and exposing through a, a slit to light reflected by said second mirror developing means, transferring means, and cleaning means provided at sequentially disposed stations along the photosensitive drum and, in addition, means to feed paper to said transferring means, and means for fixing said visible image provided near the transferring means.

24. A copying device as set forth in claim 23, in which illuminating means for surface exposure are disposed between said primary charging means and said developing means.

25. A copying device as set forth in claim 21, in which said photosensitive drum comprising a conductive base a photoconductive layer overlaid thereon, and, along said photosensitive drum charging means for charging said photosensitive drum, slit means for exposing said photosensitive drum to light reflected from said second mirror, developing means for forming a visible image on said photosensitive drum, transferring means, and cleaning means, disposed at sequential stations along said photosensitive drum and, in addition, means to feed paper and means for fixing said visible image on said paper are provided adjacent the transferring means.

* * * * *